(12) United States Patent
Sugiyama et al.

(10) Patent No.: US 11,320,653 B2
(45) Date of Patent: May 3, 2022

(54) VEHICLE DISPLAY DEVICE

(71) Applicant: Yazaki Corporation, Tokyo (JP)

(72) Inventors: Tetsuya Sugiyama, Shizuoka (JP); Junichi Ichikawa, Shizuoka (JP); Go Nakamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 254 days.

(21) Appl. No.: 16/788,678

(22) Filed: Feb. 12, 2020

(65) Prior Publication Data

US 2020/0264430 A1 Aug. 20, 2020

(30) Foreign Application Priority Data

Feb. 15, 2019 (JP) .............................. JP2019-025234

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *B60K 2370/1529* (2019.05); *B60K 2370/52* (2019.05); *B60K 2370/73* (2019.05)

(58) Field of Classification Search
CPC ................ G02B 27/0101; G02B 27/01; G02B 2027/012; G02B 2027/011; B60K 35/00; B60K 2370/1529
See application file for complete search history.

(56) References Cited

U.S. PATENT DOCUMENTS

2018/0267307 A1    9/2018   Yoshida et al.

FOREIGN PATENT DOCUMENTS

| JP | 2003-107391 A | 4/2003 |
| JP | 2018075983 A | 5/2018 |
| WO | 2017122300 A1 | 7/2017 |

*Primary Examiner* — Ryan D Howard
(74) *Attorney, Agent, or Firm* — Sughrue Mion, PLLC (57) ABSTRACT

A vehicle display device includes a projection device including a light-transmitting image display unit displaying an image, a light source emitting light to the image display unit from a back surface side or a front surface side, and a light-shielding cover disposed on a front surface of the image display unit and including an opening. The projection device projects an image onto a reflection unit disposed in front of an occupant in a vehicle. When the projection device is viewed from the front surface side, a shape of the opening is a shape similar to a shape of an image display region in the image display unit, and the opening is separated from an outer edge of the image display region and surrounds the image display region.

10 Claims, 7 Drawing Sheets

IMAGE HORIZONTAL DIRECTION

FIG.7

IMAGE HORIZONTAL DIRECTION

IMAGE HORIZONTAL DIRECTION

FIG.13

IMAGE HORIZONTAL DIRECTION

VEHICLE DISPLAY DEVICE

CROSS-REFERENCE TO RELATED APPLICATION(S)

The present application claims priority to and incorporates by reference the entire contents of Japanese Patent Application No. 2019-025234 filed in Japan on Feb. 15, 2019.

BACKGROUND OF THE INVENTION

1. Field of the Invention

The present invention relates to a vehicle display device.

2. Description of the Related Art

In related art, in vehicle display devices, there is a technique of suppressing distortion of an image. Japanese Patent Application Laid-open No. 2003-107391 discloses a technique of a head-up display device including a display unit emitting display light, a reflection member reflecting the display light to a windshield, drive means for changing an angle of the reflection member, angle detection means for detecting the angle of the reflection member, and control means for deforming an image of the display unit in accordance with the angle of the reflection member such that distortion of a virtual image caused by the windshield is reduced.

When an image is projected by emitting light to the image display unit, such as a liquid crystal display, from the back surface side thereof, light leakage in which the light of the light source leaks to the front surface side occurs outside the region displaying the image. The vehicle occupant may feel the leakage light troublesome. For example, when the shape of the leakage light is distorted, the vehicle occupant may feel the leakage light troublesome.

SUMMARY OF THE INVENTION

An object of the present invention is to provide a vehicle display device suppressing the vehicle occupant's troublesome feeling for leakage light.

In order to achieve the above mentioned object, a vehicle display device according to one aspect of the present invention includes a projection device including a light-transmitting image display unit displaying an image, a light source emitting light to the image display unit from a back surface side or a front surface side, and a light-shielding cover disposed on a front surface of the image display unit and including an opening, the projection device projecting an image onto a reflection unit disposed in front of a vehicle occupant in a vehicle, wherein when the projection device is viewed from the front surface side, a shape of the opening is a shape similar to a shape of an image display region in the image display unit, and the opening is separated from an outer edge of the image display region and surrounds the image display region.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following is a detailed explanation of a vehicle display device according to an embodiment of the present invention with reference to drawings. The present invention is not limited to the embodiment. In addition, constituent elements in the following embodiment include ones that the skilled person could easily think of or substantially the same ones.

Embodiment

Figure 1:
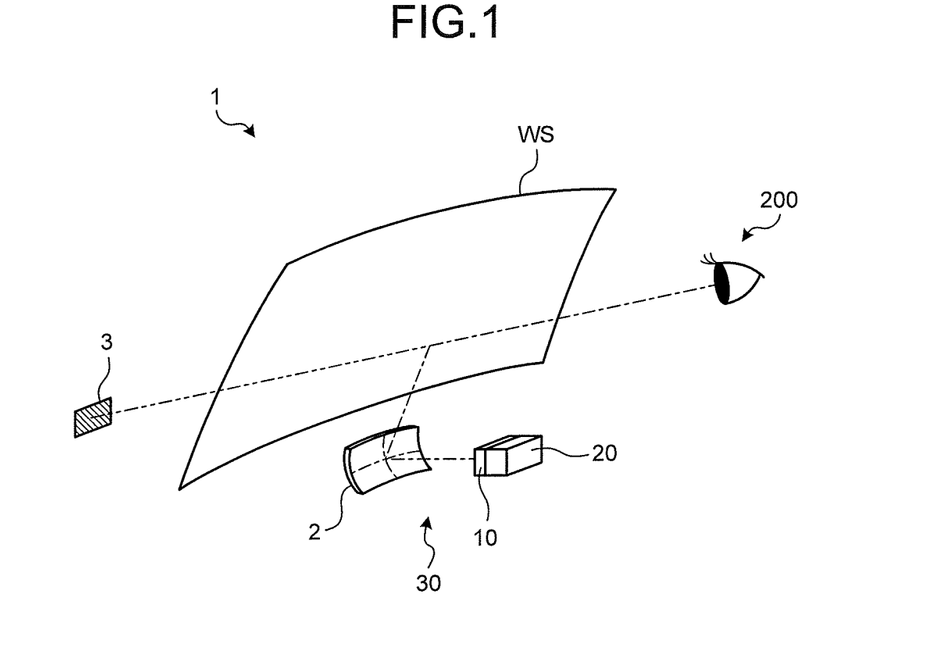
FIG. 1 is a perspective view illustrating a schematic structure of a vehicle display device according to an embodiment.
Figure 3:
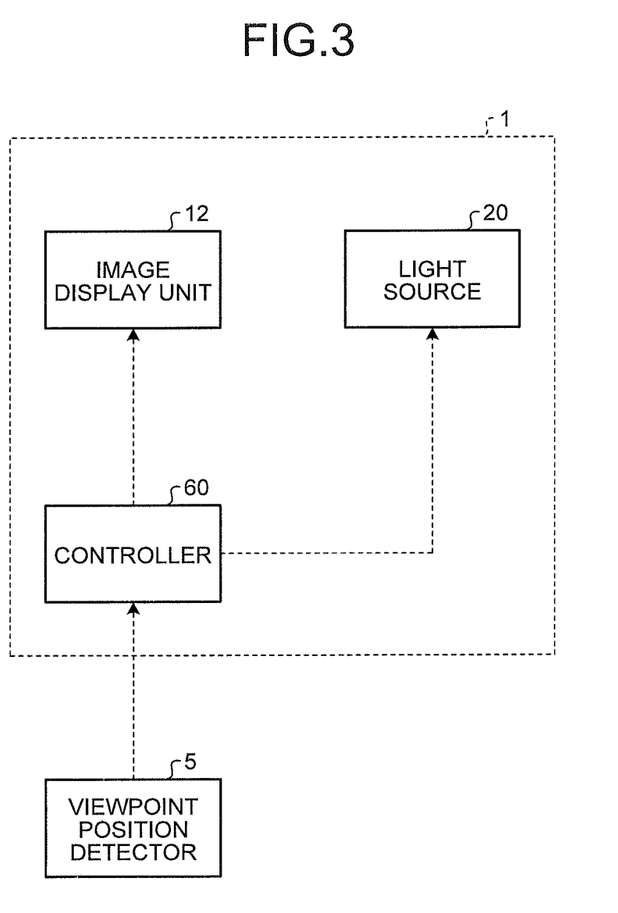
FIG. 3 is a block diagram of the vehicle display device according to the embodiment.
Figure 4:
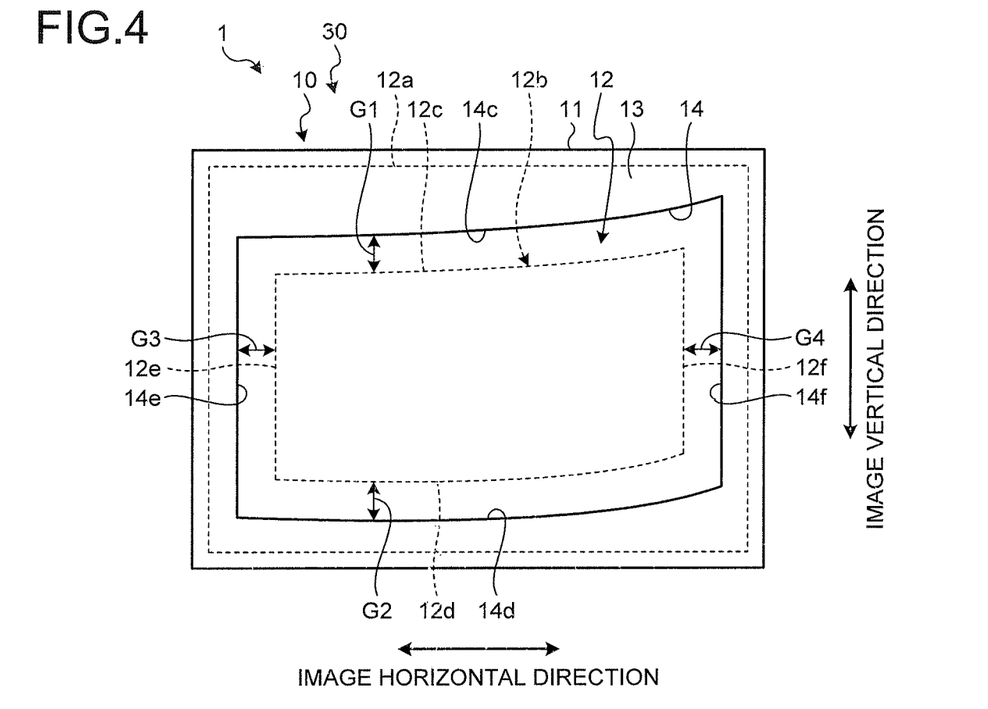
FIG. 4 is a front view of the display device according to the embodiment.
Figure 5:
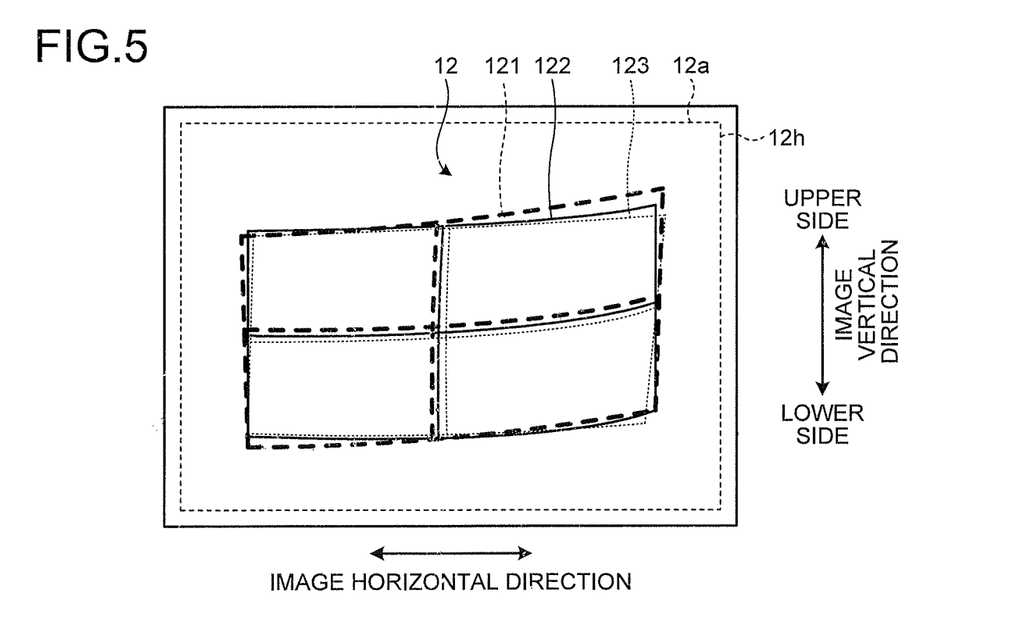
FIG. 5 is a front view illustrating an example of a plurality of regions according to the embodiment.
Figure 6:
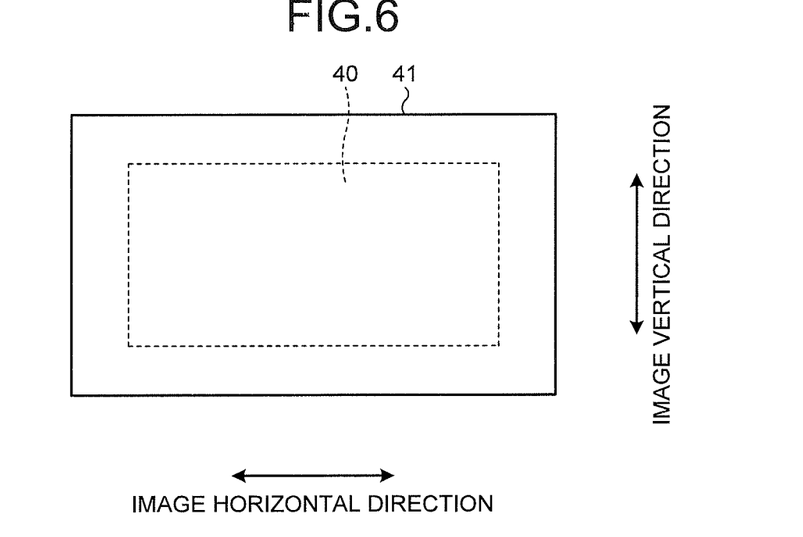
FIG. 6 is a diagram illustrating an image visually recognized by a vehicle occupant in the embodiment.
Figure 7:
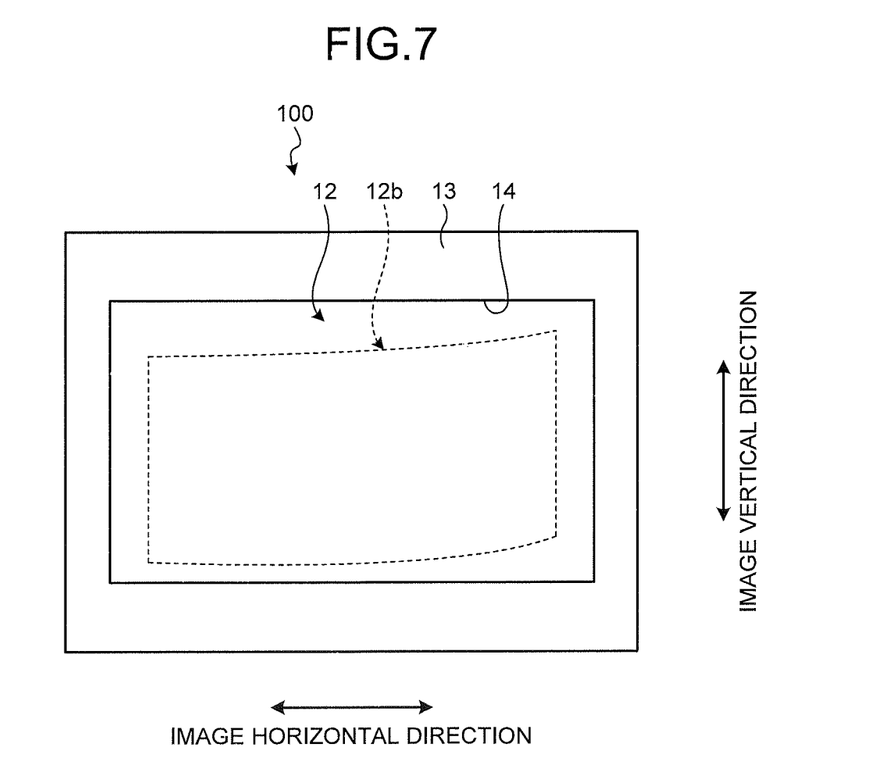
FIG. 7 is a front view of a display device according to a comparative example.
Figure 8:
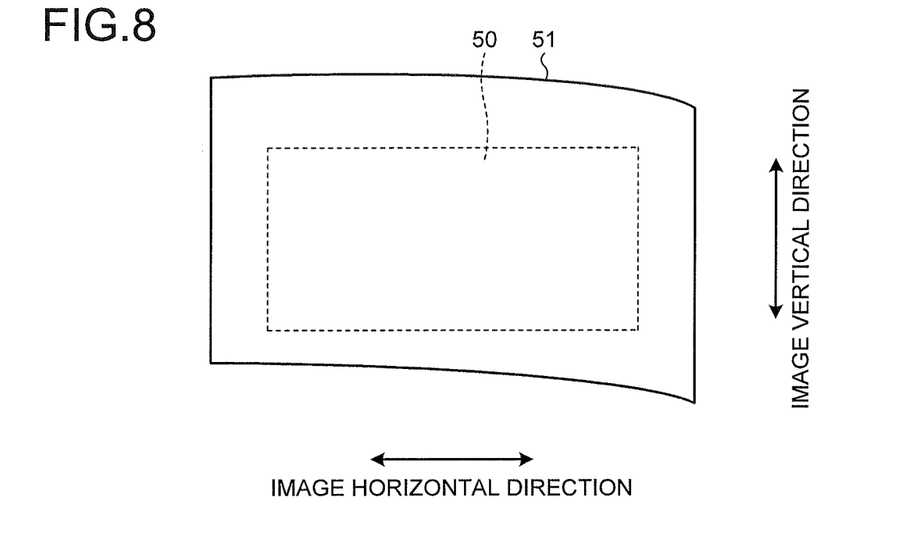
FIG. 8 is a diagram illustrating an image visually recognized by the vehicle occupant in the comparative example.
Figure 9:
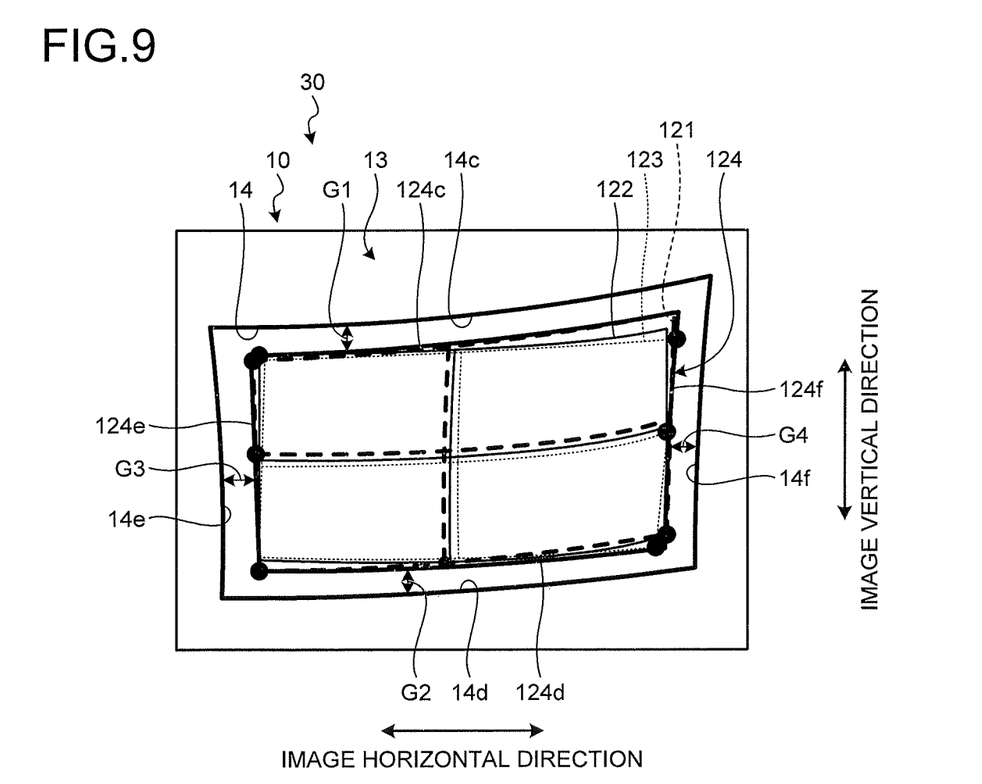
FIG. 9 is a diagram for explaining a method for determining the shape of an opening.
Figure 10:
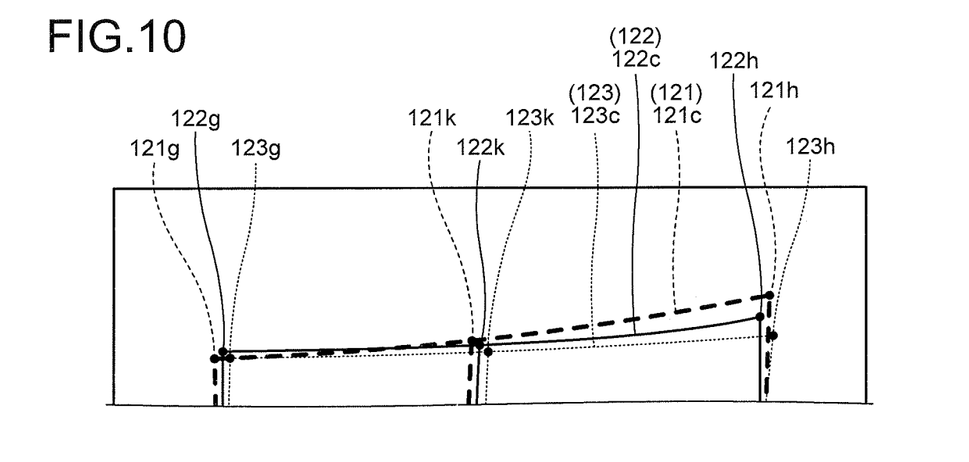
FIG. 10 is a diagram for explaining a method for determining a comprehensive region.

An embodiment will now be described with reference to FIG. 1 to FIG. 10. The present embodiment relates to a vehicle display device. FIG. 1 is a perspective view illustrating a schematic structure of a vehicle display device according to an embodiment, FIG. 2 is a perspective view of a display device and a light source according to the embodiment, FIG. 3 is a block diagram of the vehicle display device according to the embodiment, FIG. 4 is a front view of the display device according to the embodiment, FIG. 5 is a front view illustrating an example of a plurality of regions according to the embodiment, FIG. 6 is a diagram illustrating an image visually recognized by a vehicle occupant in the embodiment, FIG. 7 is a front view of a display device according to a comparative example, FIG. 8 is a diagram illustrating an image visually recognized by the vehicle occupant in the comparative example, FIG. 9 is a diagram for explaining a method for determining the shape of an opening, and FIG. 10 is a diagram for explaining a method for determining a comprehensive region.

As illustrated in FIG. 1, a vehicle display device 1 according to the present embodiment includes a projection device 30. The projection device 30 includes a display device 10, a light source 20, and a mirror 2. As illustrated in FIG. 2, the display device 10 includes a housing 11, an image display unit 12, and a cover 13. The housing 11 and the cover 13 are light-shielding members, and formed of, for example, metal. The housing 11 is a tubular member having a rectangular sectional shape.

The image display unit 12 generates and displays an image. The image display unit 12 is, for example, a liquid crystal display device, such as a thin film transistor-liquid crystal display (TFT-LCD). The image display unit 12 has light transmittance, and projects an image with light from the light source 20. The shape of the image display unit 12 in plan view is, for example, a rectangular shape. The image display unit 12 includes a display possible region 12a. The display possible region 12a is a region capable of displaying an image in the image display unit 12. The shape of the display possible region 12a is, for example, a rectangular shape. The display possible region 12a is, for example, approximately the whole surface of the image display unit 12. The image display unit 12 is capable of displaying a desired image in a desired region of the display possible region 12a.

Figure 2:
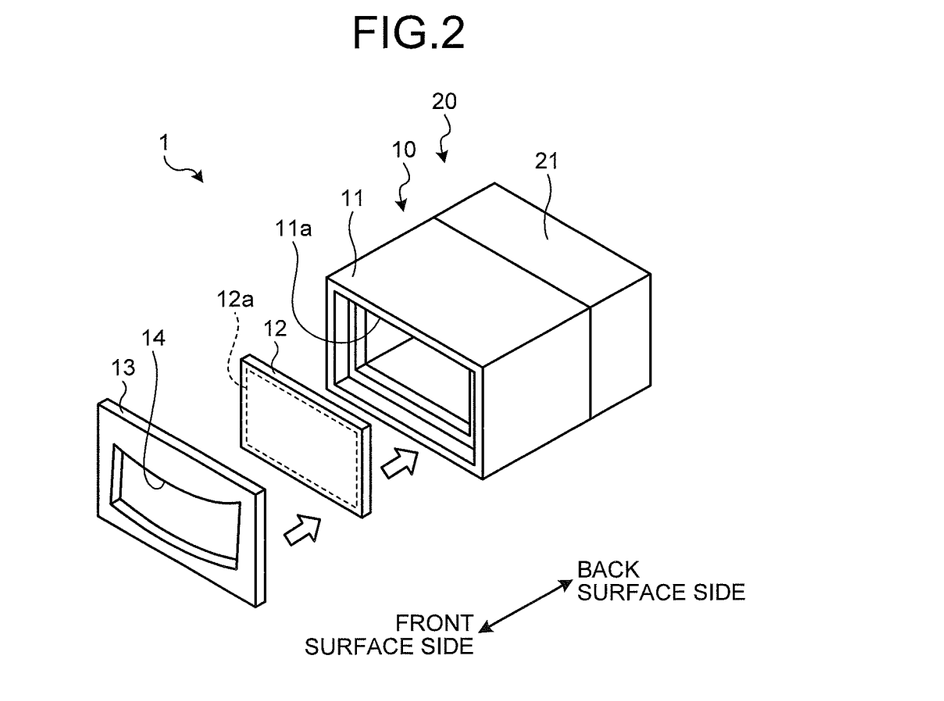
FIG. 2 is a perspective view of a display device and a light source according to the embodiment.

As illustrated in FIG. 2, the image display unit 12 is disposed in one opening portion 11a in the housing 11. In the following explanation, the side on which the image display unit 12 is disposed in the axial direction of the housing 11 is referred to as a "front surface side", and the side opposite to the front surface side is referred to as a "back surface side". The cover 13 covers the image display unit 12 from the front surface side, to close the opening portion 11a.

The light source 20 emits light to the image display unit 12 from the back surface side. The light source 20 of the present embodiment is connected, on the back surface side, with the housing 11 of the display device 10. The light source 20 includes a housing 21 and a plurality of light-emitting members arranged inside the housing 21. The light-emitting members are light-emitting elements, such as light emitting diodes (LED). The light-emitting members are arranged along, for example, the image vertical direction and the image horizontal direction. The light-emitting members emit light to the image display unit 12 from the back surface side. With the light emitted from the light-emitting members, the image displayed on the image display unit 12 is projected toward the front surface side. The light source 20 may be configured to emit light to the image display unit 12 from the front surface side. In this case, for example, the light source 20 is disposed inside the housing 11 such that light can be emitted to the image display unit 12 from the front surface side. The light source 20 may emit light to the image display unit 12 from both of the front surface side and the back surface side.

As illustrated in FIG. 3, the vehicle display device 1 includes a controller 60. The controller 60 controls the image display unit 12 and the light source 20. The controller 60 sets an image display region 12b in the image display unit 12. As illustrated in FIG. 4, the image display region 12b is a region of part of the display possible region 12a. The image display region 12b according to the present embodiment is surrounded with a first side 12c, a second side 12d, a third side 12e, and a fourth side 12f. The first side 12c and the second side 12d are sides extending along the image horizontal direction. The third side 12e and the fourth side 12f are sides extending along the image vertical direction.

The vehicle display device 1 according to the present embodiment stores therein a plurality of predetermined regions as candidates for the image display region 12b. FIG. 5 illustrates an example of the regions. FIG. 5 illustrates a first region 121, a second region 122, and a third region 123.

The first region 121, the second region 122, and the third region 123 correspond to different viewpoint positions in the vehicle vertical direction.

The first region 121 is determined such that the shape of the image viewed from a vehicle occupant 200 has a desired shape when the viewpoint position is a first height position. The shape of the first region 121 is determined such that, for example, when the display light is emitted from the whole region of the first region 121, the shape of the image formed with the display light has a rectangular shape as viewed from the first height position. The second region 122 is determined such that the shape of the image viewed from the vehicle occupant 200 has a desired shape when the viewpoint position is a second height position. In the same manner, the third region 123 is determined such that the shape of the image viewed from the vehicle occupant 200 has a desired shape when the viewpoint position is a third height position.

The shape of each of the regions 121, 122, and 123 is designed on the basis of, for example, the surface shape of a windshield WS. The shape of the windshield WS according to the present embodiment is a curved shape. The shape of each of the regions is determined, on the basis of a surface shape of the portion on which the image is reflected in the windshield WS, to correct distortion of the image generated with the surface shape. In other words, the shape of each of the regions 121, 122, and 123 is a distorted shape with respect to the desired shape such that the shape of the image visually recognized by the vehicle occupant 200 is a desired shape.

The second height position may be, for example, an intermediate position between the supposed highest viewpoint position and the supposed lowest viewpoint position. The first height position may be one of the supposed highest viewpoint position and the supposed lowest viewpoint position. The third height position may be the other of the supposed highest viewpoint position and the supposed lowest viewpoint position.

The controller 60 sets one of the regions 121, 122, and 123 as the image display region 12b. As illustrated in FIG. 3, the vehicle display device 1 according to the present embodiment includes a viewpoint position detector 5. The viewpoint position detector 5 detects the viewpoint position of the vehicle occupant 200. The vehicle occupant 200 serving as a detection target is typically a driver. The viewpoint position detector 5 includes, for example, a camera imaging the face of the vehicle occupant 200 from the front. The viewpoint position detector 5 detects the viewpoint position and/or the visual line direction of the vehicle occupant 200 on the basis of image data acquired by imaging the face of the vehicle occupant 200. The viewpoint position detector 5 transmits information of the detected viewpoint position to the controller 60.

The controller 60 sets one of the regions 121, 122, and 123 as the image display region 12b on the basis of the acquired viewpoint position. For example, when the detected viewpoint position is closest to the first height position among the first height position, the second height position, and the third height position, the first region 121 is set as the image display region 12b. The controller 60 controls the image display unit 12 to display the image in the set image display region 12b. In this case, the controller 60 controls the image display unit 12 to prevent pixels positioned outside the image display region 12b from transmitting light of the light source 20.

As illustrated in FIG. 2 and FIG. 4, the cover 13 according to the present embodiment includes an opening 14. The opening 14 is provided in a position in the cover 13 opposed to the image display unit 12. The shape of the opening 14 is a shape similar to the shape of the image display region 12b. More specifically, as illustrated in FIG. 4, the image display region 12b according to the present embodiment is curved toward the upper side in the image vertical direction as the position approaches the fourth side 12f along the image horizontal direction. The shape of the opening 14 is a curved shape corresponding to the curved shape of the image display region 12b. The opening 14 is curved toward the upper side in the image vertical direction as the position approaches a fourth side 14f along the image horizontal direction.

The opening 14 is separated from the outer edge of the image display region 12b and surrounds the image display region 12b. The outer edge of the image display region 12b is formed of the first side 12c, the second side 12d, the third side 12e, and the fourth side 12f. The opening 14 includes a first side 14c, a second side 14d, a third side 14e, and the fourth side 14f. The first side 14c, the second side 14d, the third side 14e, and the fourth side 14f correspond to the first side 12c, the second side 12d, the third side 12e, and the fourth side 12f, respectively.

As illustrated in FIG. 4, when the projection device 30 is viewed from the front surface side, the shape of the first side 14c of the opening 14 is similar to the shape of the first side 12c of the image display region 12b. In addition, the first side 14c is separated from the first side 12c in the image vertical direction.

In the same manner, the shapes of the second side 14d, the third side 14e, and the fourth side 14f are similar to the shapes of the second side 12d, the third side 12e, and the fourth side 12f, respectively. In addition, the second side 14d is separated from the second side 12d in the image vertical direction. The third side 14e and the fourth side 14f are separated from the third side 12e and the fourth side 12f, respectively, in the image horizontal direction.

The vehicle display device 1 according to the present embodiment has a structure in which the shape of the opening 14 is similar to the shape of the image display region 12b as described above, and tends not to provide the vehicle occupant 200 with troublesomeness or discomfort, as explained hereinafter. FIG. 6 illustrates an image 40 that can be caused to be visually recognized by the vehicle occupant 200 with the vehicle display device 1 according to the present embodiment. FIG. 7 illustrates a display device 100 according to a comparative example. FIG. 8 illustrates an image 50 corresponding to the display device 100 according to the comparative example. As illustrated in FIG. 7, in the display device 100 according to the comparative example, the shape of the opening 14 is a rectangular shape.

As illustrated in FIG. 6, the display light projected with the vehicle display device 1 according to the present embodiment is visually recognized as the image 40 by the vehicle occupant 200. When the whole region of the image display region 12b projects the display light, the shape of the image 40 is a rectangular or a substantially rectangular shape. Leakage light 41 exists around the image 40. The leakage light 41 is light leaking from a portion outside the image display region 12b. In the image display unit 12, light of the light source 20 slightly leaks to the front surface side, even in a portion in which no image is displayed. With the leaking light, the leakage light 41 is faintly viewed around the image 40. When the background is dark, such as at night, the leakage light 41 tends to be conspicuous.

The shape of the outer edge of the leakage light 41 depends on the shape of the opening 14. In the present embodiment, the shape of the opening 14 is similar to the shape of the image display region 12b. For this reason, as illustrated in FIG. 6, the shape of the outer edge of the image 40 is similar to the shape of the outer edge of the leakage light 41. This structure suppresses a troublesome feeling or sense of discomfort of the vehicle occupant 200 with respect to the leakage light 41.

By contrast, in the display device 100 according to the comparative example, the shape of the opening 14 is dissimilar to the shape of the image display region 12b, as illustrated in FIG. 7. Specifically, while the shape of the image display region 12b is a curved shape, the shape of the opening 14 is a rectangular shape. As a result, as illustrated in FIG. 8, the shape of leakage light 51 is a distorted shape with respect to the shape of the image 50 visually recognized by the vehicle occupant 200. Due to distortion of the shape of the leakage light 51 and/or a non-uniform width of the leakage light 51, the vehicle occupant 200 feels the leakage light 51 troublesome or uncomfortable.

As described above, the vehicle display device 1 according to the present embodiment enables suppression of troublesomeness caused by the leakage light 41. In addition, the vehicle display device 1 according to the present embodiment has the structure in which the opening 14 is separated from the outer edge of the image display region 12b, and improves visibility of images. For example, due to assembling tolerance, position displacement of the image display unit 12 from the opening 14 may occur in the image vertical direction and/or the image horizontal direction. When such position displacement occurs, the vehicle display device 1 according to the present embodiment prevents the cover 13 from covering of the image display region 12b. In addition, even when the viewpoint position of the vehicle occupant 200 changes along the vehicle vertical direction and/or the vehicle width direction, the cover 13 is prevented from covering the image display region 12b. With this structure, the vehicle display device 1 according to the present embodiment enables improvement in visibility of images.

The following is an explanation of an example of a method for determining the shape of the opening 14. FIG. 9 is a diagram for explaining a method for determining the shape of the opening 14. In the present embodiment, the shape of the opening 14 is determined on the basis of a comprehensive region 124 illustrated in FIG. 9. The comprehensive region 124 is a region taking in the first region 121, the second region 122, and the third region 123. The shape of the opening 14 is similar to the shape of the comprehensive region 124. The comprehensive region 124 includes a first side 124c, a second side 124d, a third side 124e, and a fourth side 124f. The four sides 124c, 124d, 124e, and 124f are side corresponding to the four sides 12c, 12d, 12e, and 12f, respectively, of the image display region 12b.

The following is an explanation of a method for determining the first side 124c of the comprehensive region 124, with reference to FIG. 10. The first side 124c is determined on the basis of the first side 121c of the first region 121, the first side 122c of the second region 122, and the first side 123c of the third region 123. The first side 121c of the first region 121 includes two endpoints 121g and 121h and a middle point 121k. The first side 122c of the second region 122 includes two endpoints 122g and 122h and a middle point 122k. The first side 123c of the third region 123 includes two endpoints 123g and 123h and a middle point 123k.

In the present embodiment, a first point to determine the first side 124c of the comprehensive region 124 is selected from the three endpoints 121g, 122g, and 123g. As the first point, the endpoint 122g located on the uppermost side in the image vertical direction, that is, on the outermost side in the image display unit 12 is selected among the three endpoints 121g, 122g, and 123g. In the same manner, as a second point to determine the first side 124c, the endpoint 121h located on the uppermost side in the image vertical direction, that is, on the outermost side of the image display unit 12 is selected among the three endpoints 121h, 122h, and 123h. As a third point to determine the first side 124c, the middle point 121k located on the uppermost side in the image vertical direction, that is, on the outermost side in the image display unit 12 is selected among the three middle points 121k, 122k, and 123k.

The first side 124c is determined with the selected first point 122g, the second point 121h, and the third point 121k. In the present embodiment, an arc extending through the three points 122g, 121h, and 121k is set as the first side 124c. The set first side 124c is substantially equal to a line connecting outermost points of the three first sides 121c, 122c, and 123c. By a similar method, the other three sides 124d, 124e, and 124f surrounding the comprehensive region 124 are determined. Specifically, the comprehensive region 124 according to the present embodiment is a region surrounded with four arcs. The comprehensive region 124 determined as described above substantially contains the first region 121, the second region 122, and the third region 123. In addition, the four sides 124c, 124d, 124e, and 124f of the comprehensive region 124 are lines connecting outermost points of the first region 121, the second region 122, and the third region 123.

The shape of the opening 14 is a shape similar to the shape of the comprehensive region 124. The shape of the opening 14 is, for example, a shape acquired by uniformly expanding the comprehensive region 124 in the image vertical direction and the image horizontal direction. The opening 14 is determined such that, for example, an interval G1 between the first side 124c of the comprehensive region 124 and the first side 14c of the opening 14 is uniform or substantially uniform. An interval G2 between the second side 124d of the comprehensive region 124 and the second side 14d of the opening 14 may be set uniform or substantially uniform. An interval G3 between the third side 124e of the comprehensive region 124 and the third side 14e of the opening 14 may be set uniform or substantially uniform. An interval G4 between the fourth side 124f of the comprehensive region 124 and the fourth side 14f of the opening 14 may be set uniform or substantially uniform. The four intervals G1, G2, G3, and G4 may be set to the same value.

With the shape of the opening 14 similar to the shape of the outer edge of the comprehensive region 124, the width of the leakage light 41 is equal to or larger than a certain width, even when any of the first region 121, the second region 122, and the third region 123 is set as the image display region 12b. For this reason, when the image display region 12b is switched, the vehicle occupant 200 hardly perceives change in shape of the leakage light 41. This structure suppresses troublesomeness and/or discomfort of the vehicle occupant 200 for the leakage light 41.

In addition, because the shape of the opening 14 is similar to the shape of the outer edge of the comprehensive region 124, the shape of the opening 14 can be regarded as similar to each of the shape of the first region 121, the shape of the second region 122, and the shape of the third region 123. For example, as illustrated in FIG. 9, the first side 14c and the second side 14d of the opening 14 are curved in the same direction. The curved shapes of the first side 14c and the second side 14d are similar to, substantially similar to, or analogous to the curved shapes of the corresponding sides of the three regions 121, 122, and 123. Accordingly, even when any of the three regions 121, 122, and 123 is set as the image display region 12b, the vehicle occupant 200 hardly feels the leakage light 41 troublesome.

As described above, the vehicle display device 1 according to the present embodiment includes the projection device 30 including the image display unit 12, the light source 20, and the cover 13. The image display unit 12 has light transmittance and displays an image. The light source 20 emits light to the image display unit 12 from the back surface side or the front surface side. The cover 13 has a light shielding property and the opening 14, and is disposed on a front surface of the image display unit 12. The projection device 30 projects an image onto the windshield WS. The windshield WS serves as an example of the reflection unit disposed in front of the vehicle occupant 200 in the vehicle.

When the projection device 30 is viewed from the front surface side, the shape of the opening 14 is a shape similar to the shape of the image display region 12b in the image display unit 12. In addition, when the projection device 30 is viewed from the front surface side, the opening 14 is separated from the outer edge of the image display region 12b and surrounds the image display region 12b. The vehicle display device 1 according to the present embodiment can suppress a troublesome feeling for the leakage light 41 around the image display region 12b, because the shape of the image display region 12b is similar to the shape of the opening.

The shape of the image display region 12b according to the present embodiment is a curved shape with respect to the desired shape such that the shape of the image visually recognized by the vehicle occupant 200 is the desired shape. The sides 14c, 14d, 14e, and 14f of the opening 14 are curved in the same manner as the corresponding sides 12c, 12d, 12e, and 12f of the image display region 12b. Accordingly, the shape of the image visually recognized by the vehicle occupant 200 is set to the desired shape, and the outer edge shape of the image is set similar to the outer edge shape of the leakage light. As a result, the vehicle display device 1 according to the present embodiment can suppress a troublesome feeling of the vehicle occupant 200 for the leakage light.

The vehicle display device 1 according to the present embodiment further includes the controller 60 controlling the projection device 30 and setting the image display region 12b to one of a plurality of predetermined regions 121, 122, and 123. The shape of the opening 14 is similar to the shape of the comprehensive region 124 including the regions 121, 122, and 123. With the shape of the opening 14 similar to the shape of the comprehensive region 124, a troublesome feeling of the vehicle occupant 200 for the leakage light can be suppressed.

The controller 60 according to the present embodiment sets the image display region 12b to a region corresponding to the viewpoint position of the vehicle occupant 200 in the regions 121, 122, and 123. By switching the image display region 12b in accordance with the viewpoint position, the shape of the image visually recognized by the vehicle occupant 200 can be set to an optimum shape.

First Modification of Embodiment

Figure 11:
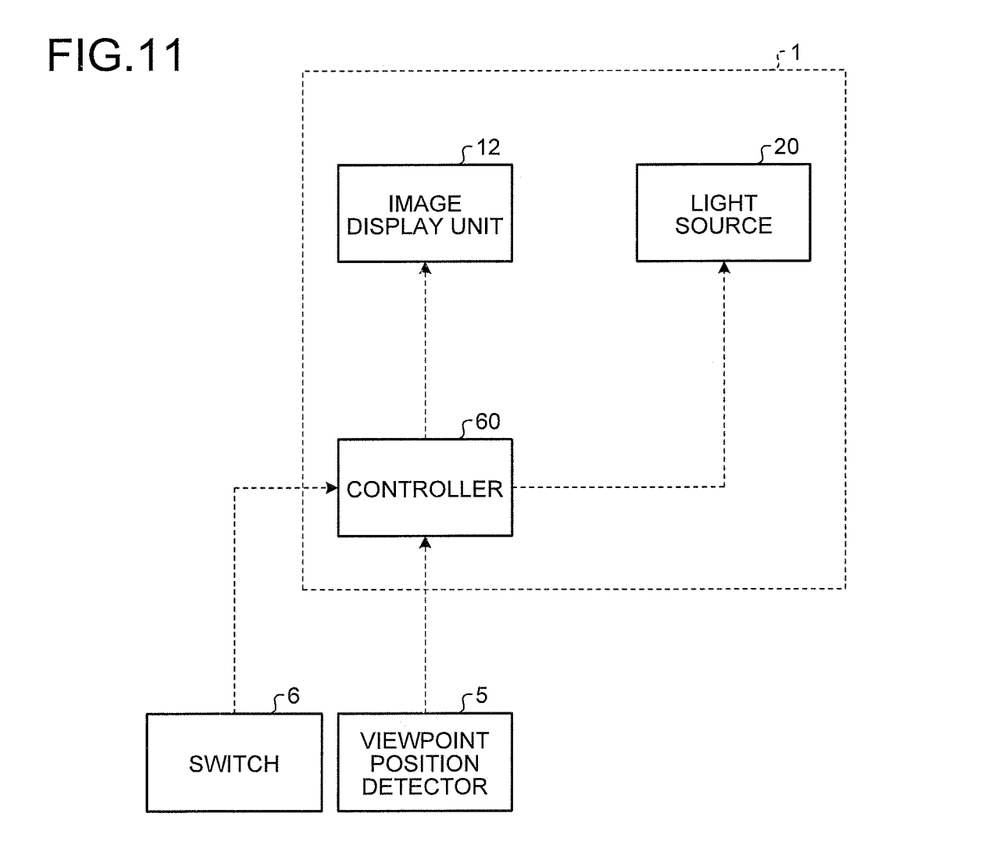
FIG. 11 is a block diagram of the vehicle display device according to a first modification of the embodiment.
Figure 12:
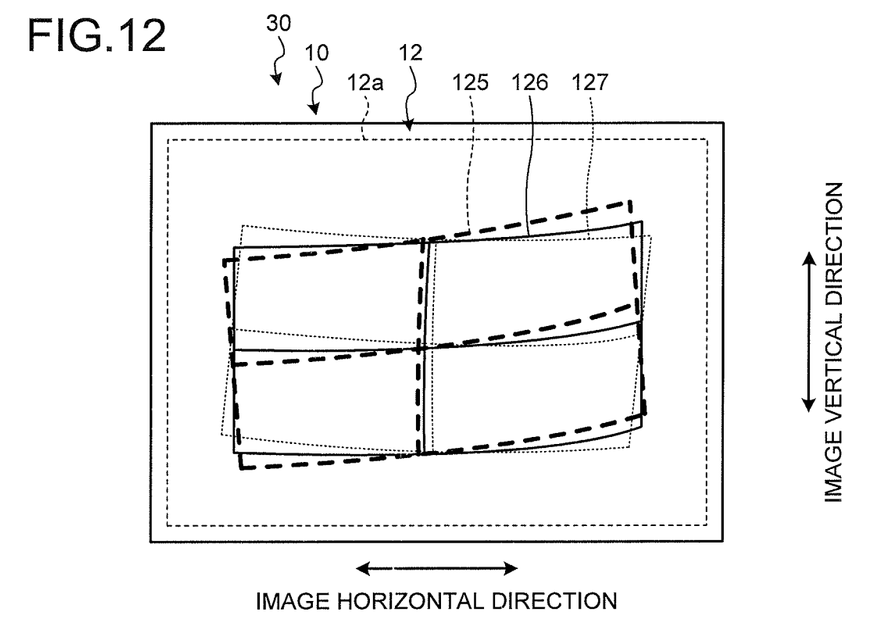
FIG. 12 is a diagram illustrating a plurality of regions according to the first modification of the embodiment.
Figure 13:
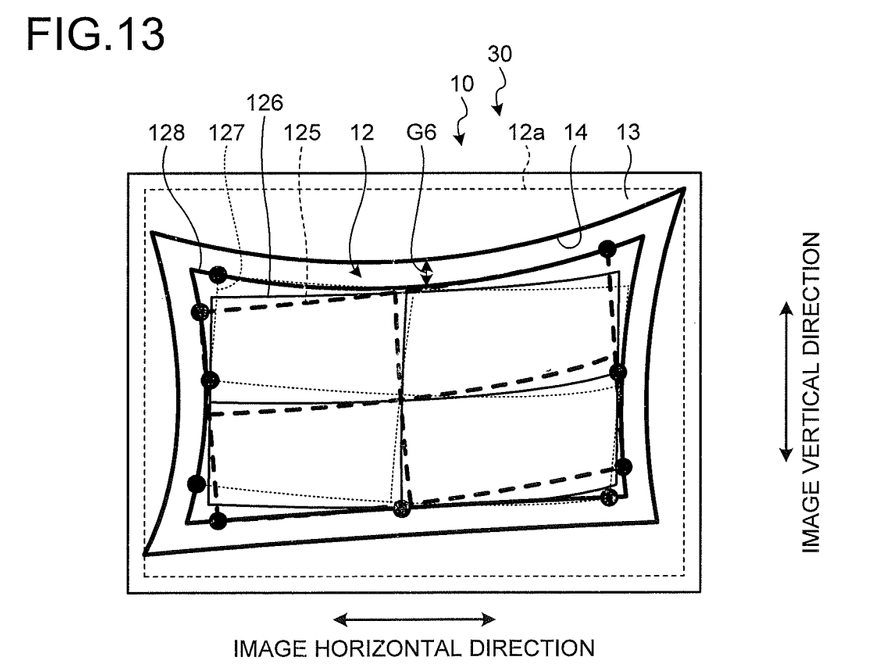
FIG. 13 is a diagram illustrating a comprehensive region according to the first modification of the embodiment.

A first modification of the embodiment will now be described. FIG. 11 is a block diagram of the vehicle display device according to the first modification of the embodiment, FIG. 12 is a diagram illustrating a plurality of regions according to the first modification of the embodiment, and FIG. 13 is a diagram illustrating the comprehensive region according to the first modification of the embodiment. The first modification of the embodiment is different from the embodiment described above in that, for example, a plurality of regions are set to regulate the inclination of the image.

As illustrated in FIG. 11, the vehicle display device 1 according to the first modification of the embodiment includes a switch 6. The switch 6 is a switch on which an operation input is performed by the vehicle occupant 200. A signal indicating an operation input to the switch 6 is transmitted to the controller 60. The switch 6 may be a physical switch mechanism or a touch switch displayed on a touch panel or the like. The switch 6 is a switch to regulate the inclination of the image displayed with the vehicle display device 1. The vehicle display device 1 rotates the image clockwise or counterclockwise in response to the operation input to the switch 6.

As illustrated in FIG. 12, a fourth region 125, a fifth region 126, and a sixth region 127 are set as candidates for the image display region 12b. The fifth region 126 may be the same region as the second region 122 of the embodiment described above. The fourth region 125 and the sixth region 127 are regions acquired by rotating the fifth region 126. For example, the fourth region 125 is a region acquired by rotating the fifth region 126 by a predetermined angle counterclockwise in FIG. 12. The sixth region 127 is a region acquired by rotating the fifth region 126 by a predetermined angle clockwise in FIG. 12. The fourth region 125, the fifth region 126, and the sixth region 127 have a substantially common center position. In the present embodiment, the shapes of the fourth region 125, the fifth region 126, and the sixth region 127 are substantially the same. Accordingly, the fourth region 125, the fifth region 126, and the sixth region 127 are regions having substantially the same shape and mutually different inclination angles with respect to the horizontal direction of the image display unit 12.

The controller 60 sets any of the fourth region 125, the fifth region 126, and the sixth region 127 as the image display region 12b, in response to an operation input to the switch 6. When the image display region 12b is switched from one of the three regions 125, 126, and 127 to another region thereof, the image visually recognized by the vehicle occupant 200 rotates clockwise or counterclockwise. In other words, the inclination of the image with respect to the vehicle width direction is changed by switching the image display region 12b from one of the three regions 125, 126, and 127 to another region thereof.

As illustrated in FIG. 13, a comprehensive region 128 according to the first modification of the embodiment is a region including the fourth region 125, the fifth region 126, and the sixth region 127. A method for determining the comprehensive region 128 is substantially the same as the method for determining the comprehensive region 124 according to the embodiment described above. Specifically, external borderlines in the comprehensive region 128 are determined to connect outermost points of the three regions 125, 126, and 127. The shape of the opening 14 is similar to the shape of the comprehensive region 128. The opening 14 is separated from the outer edge of the comprehensive region 128 and surrounds the comprehensive region 128. An interval G6 between the opening 14 and the outer edge of the comprehensive region 128 is, for example, fixed.

The vehicle display device 1 according to the first modification of the embodiment enables suppression of a troublesome feeling of the vehicle occupant 200 for the leakage light, while achieving the function of regulating the inclination of the image.

With the fourth region 125, the fifth region 126, and the sixth region 127 illustrated above enable regulation of the inclination of the image clockwise and counterclockwise by one grade, but the number of grades of regulation is not limited thereto. For example, five or more regions may be set to enable regulation of the inclination of the image clockwise and counterclockwise by two or more grades.

The shapes of the fourth region 125, the fifth region 126, and the sixth region 127 are not necessarily the same. For example, the shapes of the fourth region 125, the fifth region 126, and the sixth region 127 may be mutually different.

The vehicle display device 1 may be configured to achieve both setting of the image display region 12b in accordance with the viewpoint position and setting of the image display region 12b to regulate the inclination of the image. For example, regions to regulate the inclination of the image may be provided for each of the first region 121, the second region 122, and the third region 123. For example, a plurality of regions having the same shape as that of the first region 121 and inclination angles different from that of the first region 121 may be prepared for the first region 121. In the same manner, a plurality of regions having the same shape and different inclination angles may be prepared for each of the second region 122 and the third region 123. In this case, it is preferable that the comprehensive region is determined to include all the regions.

Second Modification of Embodiment

A second modification of the embodiment will now be described. The vehicle display device 1 may include a mechanism to change the angle of the mirror 2. For example, the mechanism to change the angle of the mirror 2 includes a motor. The vehicle display device 1 may change the angle of the mirror 2 by an operation by the vehicle occupant 200, or change the angle of the mirror 2 in accordance with a detection result of the viewpoint position detector 5.

The controller 60 may change the image display region 12b in accordance with the angle of the mirror 2. For example, in the embodiment described above, the controller 60 sets one of the first region 121, the second region 122, and the third region 123 as the image display region 12b, in accordance with the angle of the mirror 2.

Third Modification of Embodiment

The method for determining the shape of the opening 14 is not limited to the method illustrated in the embodiment and the like. For example, the shape of the opening 14 may be a shape similar to an intermediate line, instead of the shape similar to the shape of the comprehensive region 124 or 128. When the three regions 121, 122, and 123 exist as in the embodiment described above, an intermediate line is determined on the basis of a line surrounding the three regions 121, 122, and 123. As an example, the intermediate line is set to a line connecting intermediate points between the outermost line and the innermost line in the lines surrounding the three regions 121, 122, and 123.

The shape of the opening 14 may be set to a shape similar to the shape of the image display region 12b in the case where the viewpoint position is in an intermediate position in the vehicle vertical direction. For example, in the embodiment described above, suppose that the second height position is an intermediate position between the supposed highest viewpoint position and the supposed lowest viewpoint position in the viewpoint positions. In this case, the shape of the opening 14 may be set to a shape similar to the shape of the second region 122.

The shape of the opening 14 may be set to a shape similar to the shape of the image display region 12*b* in the case where the viewpoint position is a standard position in the vehicle vertical direction. For example, in the embodiment described above, suppose that a standard height position in the vehicle vertical direction is the second height position. In this case, the shape of the opening 14 may be set to a shape similar to the shape of the second region 122.

In the vehicle display device 1 having no mechanism to change the image display region 12*b*, the shape of the opening 14 may be determined on the basis of the image display region 12*b* of one type. Specifically, when the image display region 12*b* has only one shape, the shape of the opening 14 may be set to a shape similar to the shape of the image display region 12*b*.

Fourth Modification of Embodiment

A fourth embodiment of the embodiment will now be described. In the embodiment described above, the regions 121, 122, and 123 do not necessarily correspond to the viewpoint positions. For example, the vehicle display device 1 may be configured such that the vehicle occupant 200 can select the shape of the image display region 12*b* as desired from the regions 121, 122, and 123. In this case, by an operation input performed by the vehicle occupant 200, the image display region 12*b* is switched to any region in the regions 121, 122, and 123. The vehicle occupant 200 selects a region with which the appearance of the image becomes optimum for the vehicle occupant 200 from the regions 121, 122, and 123.

As described above, with the structure to enable the vehicle occupant 200 to select the image display region 12*b*, the visibility of the image is improved. The regions 121, 122, and 123 may be set to have mutually different correction degrees to correct the distortion of the image. For example, the first region 121 may have the highest correction degree to correct distortion, and the third region 123 may have the lowest correction degree to correct distortion.

Fifth Modification of Embodiment

The shape of the image 40 (see FIG. 6) visually recognized by the vehicle occupant 200 is not limited to a rectangular shape. In other words, the shape of the image display region visually recognized by the vehicle occupant 200 may be a shape other than a rectangular shape. For example, the shape of the image 40 may be a shape acquired by combining a plurality of rectangles, or a polygonal shape other than a rectangular shape.

Sixth Modification of Embodiment

A sixth modification of the embodiment will now be described. The method for determining the comprehensive region is not limited to the method illustrated in the embodiment. The shape of the comprehensive region is properly determined to reduce or remove the occupant's troublesomeness for the leakage light 41.

The number of regions is not limited to three illustrated above. For example, in the embodiment and/or the first modification of the embodiment described above, the number of regions may be two or four or more.

The reflection unit serving as the target onto which the image is projected is not limited to the windshield WS. The reflection unit may be a combiner or the like disposed in front of the vehicle occupant. The reflection unit may be a half mirror or the like provided in a meter device disposed in front of the vehicle occupant.

The details disclosed in the embodiment and the modifications described above may be carried out in proper combinations.

The vehicle display device according to the present embodiment includes a projection device including a light-transmitting image display unit displaying an image, a light source emitting light to the image display unit from a back surface side or a front surface side, and a light-shielding cover disposed on a front surface of the image display unit and including an opening. The projection device projects an image onto a reflection unit disposed in front of a vehicle occupant in a vehicle. When the projection device is viewed from the front surface side, a shape of the opening is a shape similar to a shape of an image display region in the image display unit, and the opening is separated from an outer edge of the image display region and surrounds the image display region. The vehicle display device according to the present embodiment has the structure in which the shape of the opening is similar to the shape of the image display region, and produces the effect of suppressing the vehicle occupant's troublesome feeling for leakage light.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
a projection device including a light-transmitting image display unit displaying an image, a light source emitting light to the image display unit from a back surface side or a front surface side, and a light-shielding cover disposed on a front surface of the image display unit and including an opening, the projection device projecting an image onto a reflection unit disposed in front of an occupant in a vehicle, wherein
when the projection device is viewed from the front surface side, a shape of the opening is a shape geometrically similar to a shape of an image display region in the image display unit, and the opening is separated from an outer edge of the image display region and surrounds the image display region.

2. The vehicle display device according to claim 1, wherein
the shape of the image display region is a curved shape with respect to a desired shape such that a shape of an image visually recognized by the occupant has the desired shape, and
sides of the opening are curved, geometrically similar to corresponding sides of the image display region.

3. The vehicle display device according to claim 1, further comprising:
a controller configured to control the projection device and to set the image display region to any one of a plurality of predetermined regions, wherein
the shape of the opening is geometrically similar to a shape of a comprehensive region taking in the regions.

4. The vehicle display device according to claim 2, further comprising:
    a controller configured to control the projection device and to set the image display region to any one of a plurality of predetermined regions, wherein
    the shape of the opening is geometrically similar to a shape of a comprehensive region taking in the regions.

5. The vehicle display device according to claim 3, wherein
    the controller is configured to set the image display region to a region corresponding to a viewpoint position of the occupant in the regions.

6. The vehicle display device according to claim 4, wherein
    the controller is configured to set the image display region to a region corresponding to a viewpoint position of the occupant in the regions.

7. The vehicle display device according to claim 3, wherein
    the regions include two or more regions having substantially the same shape and mutually different inclination angles with respect to a horizontal direction of the image display unit.

8. The vehicle display device according to claim 4, wherein
    the regions include two or more regions having substantially the same shape and mutually different inclination angles with respect to a horizontal direction of the image display unit.

9. The vehicle display device according to claim 5, wherein
    the regions include two or more regions having substantially the same shape and mutually different inclination angles with respect to a horizontal direction of the image display unit.

10. The vehicle display device according to claim 6, wherein
    the regions include two or more regions having substantially the same shape and mutually different inclination angles with respect to a horizontal direction of the image display unit.

* * * * *